United States Patent Office 3,605,890
Patented Sept. 20, 1971

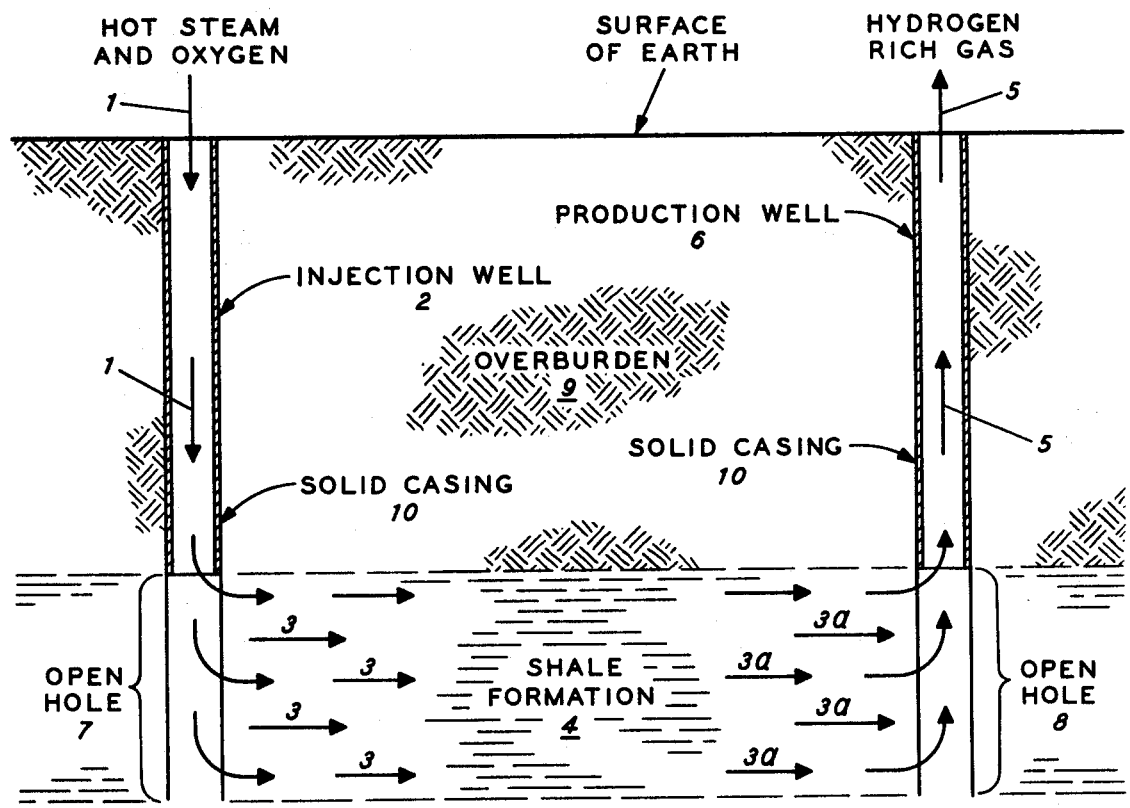

3,605,890
HYDROGEN PRODUCTION FROM A KEROGEN-DEPLETED SHALE FORMATION
Melvin M. Holm, Alameda, Calif., assignor to Chevron Research Company, San Francisco, Calif.
Filed June 4, 1969, Ser. No. 830,467
Int. Cl. E21b 43/24; C10b 57/20
U.S. Cl. 166—261                                                6 Claims

ABSTRACT OF THE DISCLOSURE

A process for producing a hydrogen-rich gas which comprises injecting steam into a kerogen-depleted shale formation through an injection well; contacting the steam with carbonaceous matter in the shale formation at a temperature between about 600° F. and 1,100° F. to obtain a hydrogen-rich gas, at a temperature between about 600° F. and 1,100° F. and with a relatively small amount of CO in the hydrogen-rich gas, the $CO_2$ to CO ratio being at least 2.5; and withdrawing the hydrogen-rich gas from the shale formation through a production well; said kerogen-depleted shale formation having a volume of at least ½ million cubic feet of kerogen-depleted shale.

BACKGROUND OF THE INVENTION

(1) Field of the invention

The present invention relates to the production of a hydrogen-rich gas; more particularly, the present invention relates to the production of an $H_2$-$CO_2$ gas mixture in a process wherein steam is reacted with carbonaceous matter. Applications by myself and co-inventor, P. E. Fischer, titled "Hydrogen Production by Reaction of Carbon with Steam," Ser. No. 830,468 and "Hydrogen Production by Reaction of Carbon With Steam and Oxygen," Ser. No. 830,469 both filed on June 4, 1969, relate to a hydrogen production process somewhat similar to the process of the present patent application, and the disclosure of the aforesaid patent applications is hereby incorporated by reference into the present patent application.

(2) Description of the prior art

Various methods have been suggested for the production of hydrogen-rich gas mixtures. Among these methods are steam-hydrocarbon reforming, partial oxidation of hydrocarbons, Lurgi heavy hydrocarbons gasification, the traditional steam-red-hot coke reaction, and modified methods of reacting carbonaceous matter with steam and oxygen, such as described in U.S. Patent 1,505,065.

The two leading processes, that is the two processes which are most frequently used to generate hydrogen, are steam-hydrocarbon reforming and partial oxidation of hydrocarbons.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200°–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are

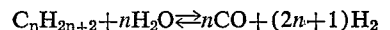
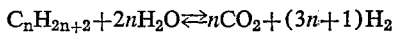

e.g., methane-steam:

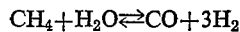
and
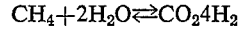

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirements of about 95 to 97 volume percent $H_2$ in the final $H_2$ product, and consistent with present metallurgical limitations, generally single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons, for example, with methane, the reaction is:

With heavier hydrocarbons, the reaction may be represented as follows:

Both catalytic and noncatalytic partial oxidation processes are in use. Suitable operating conditions include temperatures from 2,000° F. up to about 3,200° F. and pressures up to about 1,200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is:

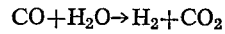

This reaction is typically effected by passing the CO and $H_2O$ over a catalyst such as iron oxide activated with chromium.

Typical analyses for hydrogen-rich gas mixtures produced by steam reforming, partial oxidation and the other hydrogen production processes previously referred to are given in Table 1, see column 3.

In all processes represented in Table 1 it can be seen that considerable CO is produced relative to $CO_2$. It can be seen from Table 1 that none of the processes has a ratio of $CO_2$ to CO greater than 2 in the raw hydrogen-rich gas mixture produced. The CO which is present in the raw hydrogen-rich gas typically is shift converted to obtain additional $H_2$ and $CO_2$, as mentioned previously in the discussion of the steam reforming and partial oxidation processes. $CO_2$ is more easily removed from hydrogen than is CO. Also, it can be readily seen from the reactions

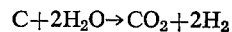
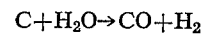

that more hydrogen is produced when carbon is oxidized fully to obtain $CO_2$, rather than partially to obtain CO. Similarly, more hydrogen is produced when hydrocarbons are oxidized completely to form $CO_2$ and $H_2$ rather than partially to form CO and $H_2$.

As indicated by Table 1, U.S. Pat. 1,505,065 relates to a process wherein steam and oxygen are reacted in a reaction apparatus with carbonaceous matter to obtain a hydrogen-rich gas mixture. It is stated in that patent that a low temperature favors the production of carbon dioxide, but yet that the temperature must be sufficiently high to enable the reaction to proceed at the desired rate. The hydrogen-rich gas mixture which is obtained according to the processes disclosed in U.S. Pat. 1,505,065 has a $CO_2$ to CO ratio of 1.5.

U.S. Patent 1,505,065 also states that the production of carbon dioxide at a given temperature, pursuant to the reaction

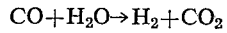
$$CO + H_2O \rightarrow H_2 + CO_2$$

is favored by the presence of an excess of steam above the amount of steam which actually reacts with the carbonaceous matter. The amount of steam used according to the process disclosed in U.S. Pat. 1,505,065 is about three-to-five pounds per pound of carbon gasified. On a nitrogen-free basis, the upper limit (5 pounds per pound of carbon gasified) of the amount of steam used according to the disclosure of U.S. Pat. 1,505,065 would result in about 42 volume percent steam in the hydrogen-rich gas which is produced. Using 23 volume percent nitrogen as the nitrogen content of the hydrogen-rich gas produced according to the process of U.S. Pat. 1,505,065, the percent steam in the hydrogen-rich gas produced is about 33 volume percent.

U.S. Pat. 1,505,065 does not disclose the use of excess steam to minimize the methane content of the hydrogen-rich gas mixture which is produced.

Also, the prior art does not disclose the reaction of steam with large masses of carbonaceous matter to thereby produce substantial quantities of a hydrogen-rich gas, even at a relatively low temperature. In addition, the prior art does not appear to disclose production of a hydrogen-rich gas from carbonaceous matter located in place in the ground, that is the earth.

SUMMARY OF THE INVENTION

According to the present invention, a process is provided for producing a hydrogen-rich gas which comprises injecting steam into a kerogen-depleted shale formation through an injection well, contacting the steam with carbonaceous matter in the shale formation to obtain a hydrogen-rich gas, and withdrawing the hydrogen-rich gas from the shale formation through a production well.

By "kerogen-depleted" shale formation is meant a shale formation from which a substantial amount of kerogen has been extracted. "Shale formation" refers to a geological deposit of shale in the earth. Kerogen is the name given to the complex organic matter present in carbonaceous shales and oil shales. Kerogen varies in composition and consists of approximately 77–83% carbon, 5–10% hydrogen, 10–15% oxygen and smaller percentages of nitrogen and sulfur.

Numerous methods have been proposed for obtaining oil from the kerogen in shale formations, as, for example, explosive fracturing of shale formations followed by retorting of the shale in place in the earth to recover shale oil. In-place retorting of the shale is frequently referred to as "in-situ" retorting. Explosive fracturing work has been carried out, under the guidance of the Bureau of Mines, and field testing of in-situ techniques to fracture and recover oil shales is presently underway.

Possible in-situ "retorting" methods include injection of heated gases into one or more injection wells at the site of a fractured shale formation to thus vaporize hydrocarbons in the shale formation and recover them as a gaseous stream withdrawn through production well from the fractured shale-oil formation.

Most previous work on in-situ recovery of oil from shale formation has proceeded on the assumption that unfractured shale formations are too impermeable to recover hydro-carbons from the shale formation by simply injecting hot gases into the shale formation via an injection well and withdrawing the hot gases, together with vaporized hydro-carbons, from the shale formation via a production well. However, recent success has been obtained in recovering shale oil from shale formations that have not been fractured. This method of in-situ retorting is described in Synthetic Fuels, volume 5, No. 4, December 1968, pages 48 through 57. The above Synthetic Fuels reference is incorporated by reference into the present patent specification.

According to the method for recovering shale oil from unfractured shale formations, hot gases are injected into the unfractured shale formation, and, evidently, the shale formation breaks down sufficiently to establish a flow pattern between the injection well and one or more production withdrawal wells in the shale formation. The hot gases which are injected into the shale formation come into contact with the shale as they flow from the lower part of the injection well through the shale formation toward the production well; when the hot gases come into contact with the shale, kerogen is decomposed and vaporized shale oil is carried along with the hot gasses which continue to flow through the shale formation and then up out of the shale formation via the production well. The hot gases and vaporized shale oil are withdrawn from the production well and are separated by condensing out the shale oil. The gases are then recycled, and, together with additional make-up gases, are compressed and then heated for re-injection into the shale formation. The gases are injected at a temperature of about 900° F. via an injection well. In the process of depleting the shale formation of its kerogen content, the shale formation is heated to a high temperature, of the order of 700 to 900° F. Thus, when shale-oil recovery from the given shale formation ceases, a kerogen-depleted shale formation which has a high heat content remains. Also, the kerogen-depleted shale formation is more porous than it was prior to recovery of shale oil from the shale formation. The kerogen-depleted shale formation typically will not be as rich in hydrogen content relative to carbon content, because the volatile hydrocarbons which are removed from

TABLE 1.—HYDROGEN PRODUCTION PROCESSES

| | | Steam-hydrocarbon reforming | Partial oxidation | Lurgi heavy hydrocarbon gasification | Steam, red-hot coke | U.S. Patent 1,505,065 |
|---|---|---|---|---|---|---|
| | $H_2$, volume percent | 74.2 | 44.5 | 39.4 | 50 | 47 |
| | CO, volume percent | 11.5 | 49 | 16.4 | 49 | 12 |
| | $CO_2$, volume percent | 11.7 | 5.3 | 32.3 | 1 | 18 |
| | $N_2$, volume percent | 0.3 | 0.4 | 0.4 | | 23 |
| | $CH_4$, volume percent | 2.2 | 0.6 | 11.3 | | |
| Volume ratio | $CO_2/CO$ | 1 | 0.1 | 2 | 0.02 | 1.5 |
| Do | $CO_2/CH_4$ | 5.3 | 9 | 2.9 | | |
| Oxidant | | (¹) | (²) | (²) | (¹) | (³) |
| Hydrogen gas withdrawal temperature, ° F | | 1,525 | 2,700 | 1,800 | 2,730–3,270 | 1,112–1,38 |

¹ Steam.  ² Steam plus $O_2$.  ³ Steam plus air.

the shale formation by the in-situ retorting process contain more hydrogen relative to carbon than does the shale formation prior to in-situ retorting.

Natural gas is a particularly advantageous gas for in-situ recovering shale oil from a natural deposit of oil shale. The use of natural gas for such operation is disclosed in U.S. Pat. 3,241,611; the disclosure of which patent is incorporated by reference into the present patent application.

Referring once again more particularly to the present invention, an important feature of the present invention is that the process is carried out by reacting steam with carbonaceous matter in a kerogen-depleted shale, which shale formation by its very nature will indeed be a very large mass of carbonaceous matter. The carbonaceous matter may be simply carbon or various hydrocarbon components. However, one of the advantages of the present invention is that hydrogen is produced by the reaction of steam with carbonaceous matter, even though the carbonaceous matter has little or no hydrogen. The steam preferably is injected in the shale formation at a temperature between about 300° F. and 1,350° F., and more preferably between 600° and 1,100° F. According to the patent applications by myself and a co-inventor referred to above under "Field of the invention," a hydrogen-rich gas which is relatively lean in carbon monoxide can be produced by reacting carbon with steam at a relatively low temperature. However, one disadvantage in carrying out the reaction at a low temperature is the very low reaction rates obtained. The process of the present invention substantially overcomes this disadvantage by utlizing a large mass of carbonaceous matter so that a commercial amount of hydrogen may be produced, even though the reaction rate per unit mass is relatively slow.

It is preferred in the process of the present invention to use large amounts of steam so that the hydrogen-rich gas mixture which is withdrawn from the reaction zone contains at least 60 volume percent steam. As explained more fully in my previously referred-to co-inventorship application the use of a large amount of steam is effective to maintain relatively low $CH_4$ content, as well as relatively low CO content in the hydrogen-rich gas which is produced.

Sufficient steam is fed to the reaction zone, so that the ratio of $CO_2$ to $CH_4$ and the ratio of $CO_2$ to CO are both at least about 2.5 in the hydrogen-rich gas mixture withdrawn from the reaction zone. Preferably, sufficient steam is fed to the reaction zone so that the ratio of $CO_2$ to $CH_4$ and the ratio of $CO_2$ to CO are both at least about 4.0 in the hydrogen-rich gas wtihdrawn from the reaction zone.

In the present specification "hydrogen-rich gas" means a gaseous stream containing at least about 1 volume percent hydrogen. However, the hydrogen-rich gas generated according to the process of the present invention generally will contain above 5 volume percent hydrogen, and usually upwards of 10 volume percent hydrogen.

The reaction of steam with carbon, or with a hydrocarbon, is an endothermic reaction. Thus, although one of the advantages of the present invention is its suitability for application to a hot kerogen-depleted shale formation, a method must be provided for maintaining the temperature in the kerogen-depleted shale formation at suitable steam-carbon, or steam-hydrocarbon, reaction temperature. That is, the decrease in temperature caused by the endothermic hydrogen production reaction must be compensated for before the temperature becomes too low for suitable reaction rates. Heating the injected steam to a high temperature is a preferred means of maintaining suitable temperature for the hydrogen production reaction in the kerogen-depleted shale formation. According to another preferred embodiment of the present invention, an oxidizing gas is injected into the shale formation, in addition to the steam which is injected, and the oxidizing gas is burned with residual carbonaceous matter in the shale formation to maintain the temperature between about 600° F. and 1,350° F., preferably between about 800 and 1,100° F., in at least a portion of the shale formation. It is preferred to inject the oxidizing gas together with the injected steam.

Various oxidizing gases may be used. Oxygen is a particularly preferred oxidizing gas.

BRIEF DESCRIPTION OF THE DRAWING

The drawing is a schematic flow diagram illustrating application of the process of the present invention to production of hydrogen-rich gas from a kerogen-depleted shale formation.

DETAILED DESCRIPTION OF THE DRAWING

Referring in more detail to the drawing, hot steam at a temperature of about 1,100° F. is injected, together with about 2 volume percent oxygen, as indicated by arrow 1 into the shale formation via injection well 2. The steam and $O_2$ travel down through the injection well. The lower part of the injection well is open to allow the steam and $O_2$ to enter into the shale formation 4, as indicated by the arrows with numeral 3. The earth above that portion of the shale formation which is being processed for hydrogen production may be referred to as "overburden" and in the drawing is indicated by numeral 9. The overburden above the shale formation in question may amount to about 1000 or 2000 feet in vertical depths. For example, the overburden may be about 1000 feet in depth, whereas the shale formation may be only about 150 feet in depth. Thus using these typical numbers in the drawing, the steam and $O_2$ are passed down through the injection well 2, through about 1000 feet of solid casing as indicated by numeral 10. At the end of the injection well is an open-hole area which is indicated by numeral 7. For purposes of the simplified drawing, the open-hole area is shown as being opened only on the side facing the production well. However, in practice, it is preferable to have one injection well surrounded by several production wells. The injected steam and $O_2$ will then flow out in various directions from the injection well and will set up flow patterns toward the production wells.

The open-hole section of the injection well, for purposes of the present description, is about 150 feet in length (depth). Through this open area the steam flows outwardly into the shale formation and comes in contact with hot carbonaceous matter in the kerogen-depleted shale formatoin. Hydrogen is produced according to the reaction:

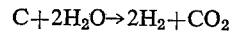

$$C+2H_2O \rightarrow 2H_2+CO_2$$

Heat is replenished by burning $O_2$ with a portion of the carbonaceous matter in the shale formation. Thus the $O_2$ replenishes the endothermic heat of the reaction in producing hydrogen from carbon and steam, so that the temperature in the shale formation in the areas of reaction is maintained at about 900° F. In many instances no large amount of initial heat will need to be supplied to the kerogen-depleted shale formation, because the formation will initially be at about 800° F. or 900° F. due to the previous in-situ retorting of the shale for recovery of shale oil.

Toward the withdrawal end of the shale formation schematically indicated in the drawing, hydrogen-rich gas which has been formed by the reaction of steam with carbonaceous matter flows into production well 6 as indicated by arrows 3a. The hydrogen-rich gas is withdrawn from the production well as indicated by arrow 5. Preferably, the hydrogen is separated from steam by heat exchange, generating new steam to be injected via the injection well, and by additional lower temperature cooling so that a substantially water-free $H_2$-$CO_2$ gas mixture is obtained. $CO_2$ may then be separated from the hydrogen according to well-known means, and hydrogen may then be used in a hydro-conversion plant, as, for example, in a hydrotreating or hydrocracking plant applied to the upgrading of shale oil.

An important aspect of the present invention is the largeness of the mass of the kerogen-depleted shale formation, which mass is available for reaction with the injected steam to form hydrogen and carbon dioxide. As indicated above, for example, the formation might be 150 ft. deep. The area which is covered by the kerogen depleted shale formation which is treated with injected steam for the production of hydrogen may be, for example, 100 ft. square. Thus the volume of carbonaceous matter to be reacted with the injected steam would be 100' x 100' x 150'=1,500,000 cubic feet. This may be contrasted to a normal reactor vessel, for example, a reactor vessel 10' in diameter by 30' long, the volume of which would be about 2,400 cu. ft. Thus the process of the present invention operates on a carbonaceous mass which is much larger than what could be contained in a normal commercial reactor vessel. Usually, the difference in volume of the kerogen depleted shale formation being treated for hydrogen production according to the process of the present invention will be larger than the volume of a commercial reactor vessel by at least a factor of 10. The shale formation being treated for hydrogen production seldom would contain less than 25,000 to 50,000 cu. ft. of kerogen-depleted shale, and oftentimes would contain upwards of one-half to two or three million cubic feet of kerogen-depleted shale. This tremendous volume of carbonaceous matter may result in several months or even years of in-situ hydrogen production.

More importantly, because of the large volume of reacting mass employed in the process of the present invention a low reaction temperature can be employed, and thus the carbon monoxide production minimized, while still obtaining a satisfactorily high hydrogen production rate. The reaction temperature employed in the process of the present invention may be as low as 800 to 700° F., where the thermodynamic equilibrium of the carbon plus steam reaction results in hydrogen plus carbon dioxide production with low (usually less than a fraction than a volume per cent) carbon monoxide production. Normally, the steam plus carbon reaction would be considered impractical at temperatures below 1,200° F. because of the slowness of the reaction rate, i.e., the rate of formation of hydrogen per pound of carbon, whereas according to the process of the present invention temperatures below 1,200° F., as for example, 1,100°–850° F., and even as low as 800° or 700° F., are the preferred temperatures for producing commercial quantities of hydrogen-rich gas.

Although various specific embodiments of the invention have been described and show, it is to be understood they are meant to be illustrative only and not limiting. Certain features may be changed without departing from the spirit or essence of the invention. It is apparent that the present invention has broad application to the production of hydrogen-rich gas mixtures from kerogen-depleted shale formations. Accordingly, the invention is not to be construed as limited to the specific embodiments described, but only as defined in the appended claims.

I claim:

1. A process for producing a hydrogen-rich gas which comprises injecting steam into a kerogen-depleted shale formation through an injection well; contacting the steam with carbonaceous matter in the shale formation at a temperature between about 600° F. and 1,100° F. to obtain a hydrogen-rich gas, at a temperature between about 600 F. and 1,100° F. and with a relatively small amount of CO in the hydrogen-rich gas, the $CO_2$ to CO ratio being at least 2.5; and withdrawing the hydrogen-rich gas from the shale formation through a production well; said kerogen-depleted shale formation having a volume of at least ½ million cubic feet of kerogen-depleted shale, and wherein the amount of steam injected is sufficient to maintain at least 60 volume percent steam in the hydrogen-rich gas withdrawn from the production well.

2. A process in accordance with claim 1 wherein the steam is heated to a high temperature before it is injected into the formation through the injection well so as to supply necessary heat for the endothermic reaction to maintain the steam-carbonaceous matter contacting temperature between about 600° F. and 1,100° F.

3. A process in accordance with claim 1 wherein the steam is essentially the only material injected into the formation through the injection well.

4. A process in accordance with claim 1 wherein the temperature at which the steam is contacted with the carbonaceous matter in the kerogen-depleted shale formation is a sufficiently low temperature within the range 600° F. to 1,100° F. so that the ratio of $CO_2$ to CO in the hydrogen-rich gas which is withdrawn from the production well is at least 4.0.

5. A process in accordance with claim 1 wherein the hydrogen-rich gas withdrawn from the production well is cooled and then $CO_2$ is removed from the hydrogen-rich gas so as to obtain a purified hydrogen gas stream and wherein the purified hydrogen gas stream is used for hydrotreating or hydrocracking shale oil.

6. A process for producing a hydrogen-rich gas which comprises:
   (a) injecting steam and oxygen into a kerogen-depleted shale formation;
   (b) contacting the steam with residual carbonaceous matter in the shale formation to produce a hydrogen-rich gas;
   (c) burning the oxygen with residual carbonaceous matter in the shale formation to generate heat so that at least a portion of the residual carbonaceous matter which is contacted with the steam is at a temperature between about 800° F. and 1,100° F., and so that the hydrogen-rich gas which is produced contains only a relatively small amount of CO, the $CO_2$ to CO ratio being at least 2.5; and
   (d) withdrawing the produced hydrogen-rich gas from the shale formation, and wherein the amount of steam injected is sufficient to maintain at least 60 volume percent steam in the hydrogen-rich gas withdrawn from the production well.

References Cited

UNITED STATES PATENTS

| | | | |
|---|---|---|---|
| 2,695,163 | 11/1954 | Pearce et al. | 166—261X |
| 2,839,141 | 6/1958 | Walter | 166—261 |
| 2,958,519 | 11/1960 | Hurley | 166—261X |
| 3,044,545 | 7/1962 | Tooke | 166—261X |
| 3,284,281 | 11/1966 | Thomas | 166—272X |
| 3,285,335 | 11/1966 | Reistle | 166—272X |
| 3,388,742 | 6/1968 | Oaks | 166—272X |

IAN A. CALVERT, Primary Examiner

U.S. Cl. X.R.

48—210; 166—272